United States Patent [19]

Holcomb

[11] 4,067,498
[45] Jan. 10, 1978

[54] SPRAYING SYSTEM

[76] Inventor: James M. Holcomb, 6515 NW. 11th, Oklahoma City, Okla. 73127

[21] Appl. No.: 697,062

[22] Filed: June 17, 1976

[51] Int. Cl.² ............................................. B05B 1/26
[52] U.S. Cl. .................................... 239/304; 222/67; 239/500; 239/521
[58] Field of Search .................. 222/67; 239/521, 522, 239/434, 159, 500, 304

[56] References Cited

U.S. PATENT DOCUMENTS

| 436,942 | 9/1890 | Scheen | 239/521 X |
|---|---|---|---|
| 1,410,389 | 3/1922 | Dorsey | 239/521 X |
| 2,221,487 | 11/1940 | Moore | 222/67 |
| 2,571,871 | 10/1951 | Hayes | 239/521 X |
| 2,767,022 | 10/1956 | Kennard et al. | 239/521 X |
| 3,583,691 | 6/1971 | Twine | 263/40 |

FOREIGN PATENT DOCUMENTS

| 12,183 | 12/1928 | Australia | 239/521 |

Primary Examiner—Evon C. Blunk
Assistant Examiner—Michael Mar
Attorney, Agent, or Firm—Dunlap, Codding & McCarthy

[57] ABSTRACT

An improved spraying system for distributing a first fluid having a second fluid entrained therein, the system comprising a pair of fluid reservoirs and an improved proportioner nozzle assembly having a baffle and a deflector to facilitate mixing and directional control.

2 Claims, 5 Drawing Figures

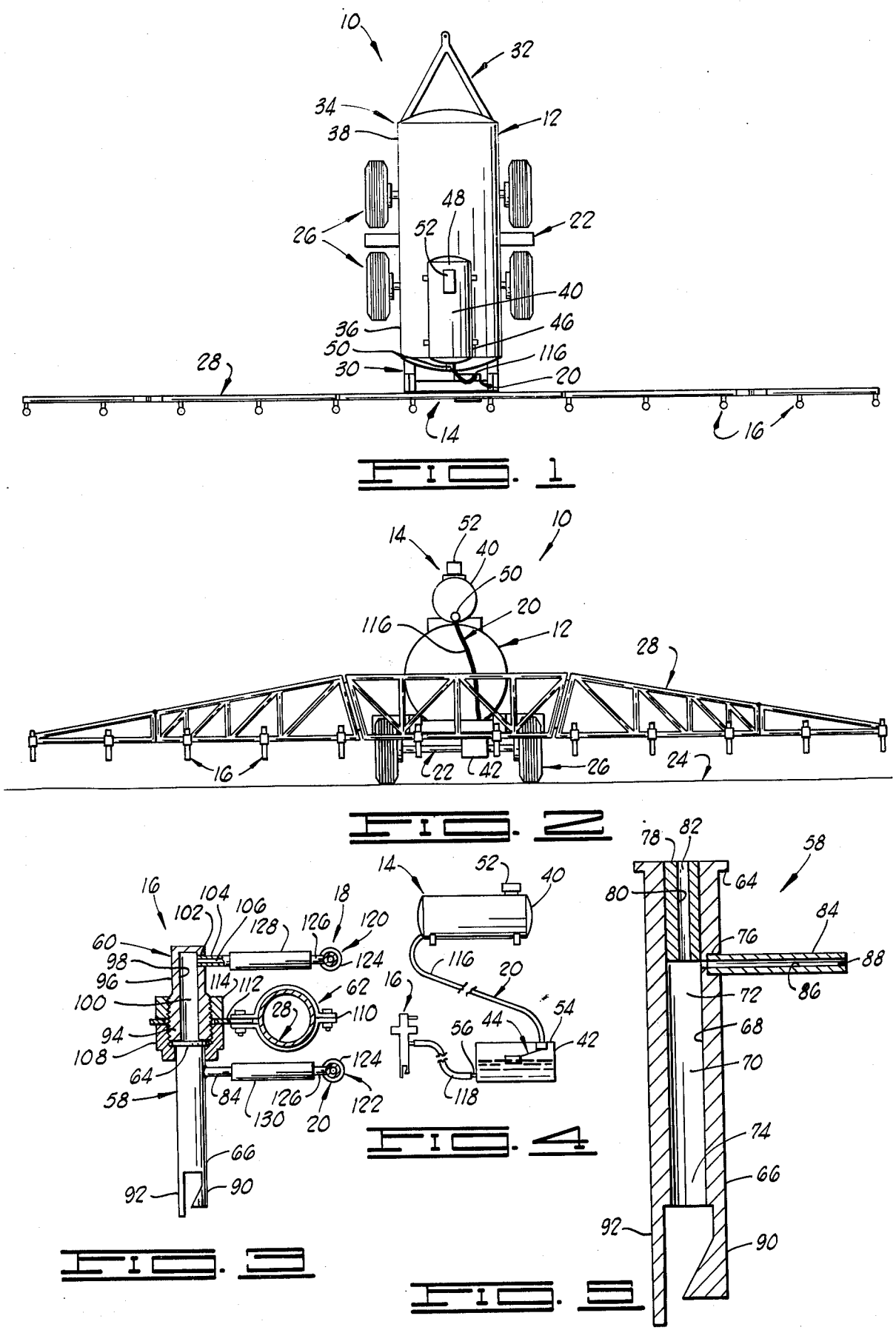

SPRAYING SYSTEM

BACKGROUND OF THE INVENTION

1. Field of the Invention

This invention relates generally to improvements in methods and apparatus for proportionally mixing and distributing fluids and, more particularly, but not by way of limitation, to a method and apparatus for distributing a first fluid, having a second fluid entrained therein.

2. Description of the Prior Art

In the past, various methods and apparatus have been used to proportionally mix a concentrate fluid with a carrier fluid, via entrainment, in order to obtain a relatively less concentrated fluid mixture for distribution in the form of a jet or a spray. In general, the concentrate fluid and the carrier fluid are held in separate containers and are conveyed to a mixing chamber via separate conduits. Within the mixing chamber, the concentrate fluid is generally introduced into the stream of carrier fluid via pressurized injection or suction infusion at a predetermined angle to aid mixing of the fluids, with the fluid mixture ratio generally being determined by the ratios of the proportions of the mixing chamber and the fluid delivery conduits. Once the fluids have been commingled, the fluid mixture is usually distributed in the form of a jet or a spray.

There are several general methods whereby a concentrate fluid is injected into a stream of carrier fluid. For example, fluid injection apparatus are shown in the following U.S. Pat. No. 1,198,036, issued to R. E. Jackson; U.S. Pat. No. 1,780,571, issued to W. Teale et al.; U.S. Pat. No. 2,077,257, issued to F. W. Ofeldt; and U.S. Pat. No. 2,676,471, issued to W. M. Pierce, Jr. Apparatus whereby a concentrate fluid is introduced into a stream of carrier fluid generally by suction or gravity flow are shown in U.S. Pat. No. 1,841,362, issued to P. M. Cabell and U.S. Pat. No. 2,388,445, issued to J. W. R. Stewart. Entrainment of a concentrate fluid in a carrier fluid via gravity flow is shown in U.S. Pat. No. 3,018,058, issued to H. Koller and U.S. Pat. No. 2,509,122, issued to J. Wolfson. Additional related apparatus are shown in U.S. Pat. No. 3,433,417, issued to H. A. Poppitz and U.S. Pat. No. 3,770,209, issued to R. L. Wilcox.

Control devices to prevent fluid backflow and to control fluid level within a container are shown in the following U.S. Pat. No. 2,381,589, issued to S. A. Hayes; U.S. Pat. No. 3,433,417, issued to H. A. Poppitz; U.S. Pat. No. 1,841,362, issued to P. M. Cabell and U.S. Pat. No. 2,683,057, issued to T. E. Nusbaum. The control of suction, and therefore mixing, by a closeable vent hole which connects the mixing chamber to the atmosphere, is shown in U.S. Pat. No. 2,571,871, issued to S. A. Hayes and U.S. Pat. No. 2,527,848, issued to A. E. Prack.

Apparatus for distributing a fluid mixture are shown in the following U.S. Pat. No. 1,198,036, issued to R. E. Jackson; U.S. Pat. No. 1,213,675, issued to M. Maynard; U.S. Pat. No. 1,659,538, issued to S. Angrove; U.S. Pat. No. 1,711,794, issued to O. B. Kibele; U.S. Pat. No. 1,780,571, issued to W. Teale et al.; U.S. Pat. No. 1,997,897, issued to H. A. Conley; U.S. Pat. No. 2,045,164, issued to H. Richards; U.S. Pat. No. 2,077,257, issued to F. W. Ofeldt; U.S. Pat. No. 2,112,618, issued to E. A. Domes; U.S. Pat. No. 2,381,589, issued to S. A. Hayes; U.S. Pat. No. 2,388,445, issued to J. W. R. Stewart; U.S. Pat. No. 2,527,848, issued to A. E. Prack; U.S. Pat. No. 2,558,681, issued to G. J. Hachmeister; U.S. Pat. No. 2,571,871, issued to S. A. Hayes; U.S. Pat. No. 2,676,471, issued to W. M. Pierce Jr.; U.S. Pat. No. 2,683,057, issued to T. E. Nusbaum; U.S. Pat. No. 3,018,058, issued to H. Koller; U.S. Pat. No. 3,260,464, issued to E. W. Harant; U.S. Pat. No. 3,372,875, issued to A. J. Torrey; U.S. Pat. No. 3,433,417, issued to H. A. Poppitz; U.S. Pat. No. 3,595,482, issued to J. A. Jefferson-Loveday and U.S. Pat. No. 3,770,209, issued to R. L. Wilcox.

SUMMARY OF THE INVENTION

An object of the invention is to provide an improved method and apparatus for mixing and distributing fluids.

Another object is to provide an improved method and apparatus for entraining fluids via a flow-induced suction.

A further object is to provide an improved fluid proportioning system whereby fluid mixture remains substantially constant.

A still further object is to provide an improved distribution system utilizing a deflector and a baffle which facilitate mixing and distributing a fluid mixture.

Another object is to provide a spraying system which is simple in operation and economical to manufacture.

Other objects and advantages of the invention will be evident from the following detailed description when read in conjunction with the accompanying drawings which illustrate the preferred embodiment of the invention.

BRIEF DESCRIPTION OF THE DRAWINGS

FIG. 1 is a top plan view of a spraying system of the present invention.

FIG. 2 is an end, elevational view of the spraying system shown in FIG. 1.

FIG. 3 is a partial sectional, side elevational view of the nozzle assembly shown generally in FIGS. 1 and 2.

FIG. 4 is a partial sectional, side elevational view of a float valve and placement thereof.

FIG. 5 is an enlarged sectional view of a portion of the nozzle assembly shown in FIG. 3.

Description of the Preferred Embodiment

Referring to the drawings in general and to FIGS. 1 and 2 in particular, shown therein and designated by the general reference numeral 10 is a spraying system for distributing a first fluid having a second fluid entrained therein constructed in accordance with the preferred embodiment of the present invention. The spraying system 10 is generally comprised of a first fluid reservoir 12, a second fluid reservoir 14, at least one nozzle assembly 16, a first fluid conduit 18 and a second fluid conduit 20.

The spraying system 10 is preferably mounted on a chassis 22 constructed of rigid, steel members to form a substantially flat bed supported above a ground surface 24 by a plurality of wheels 26. The chassis 22 has a conventional folding boom assembly 28 connected to one end 30 thereof, and a conventional drawbar 32 pivotally connected to the other end 34 thereof.

The first fluid reservoir 12, which holds a quantity of the first fluid, is generally cylindrical in shape with opposite ends 36 and 38 and is horizontally mounted upon the chassis 22. A valve controlled first fluid outlet (not shown) is provided through the vertically lower portion of the end 36 of the first fluid reservoir 12.

The second fluid reservoir 14, which holds a quantity of the second fluid, is comprised of a primary second fluid reservoir 40 holding a first quantity of the second fluid, a secondary second fluid reservoir 42 holding a second quantity of the second fluid, and a float valve 44. The primary second fluid reservoir 40 (sometimes referred to as the primary reservoir 40) is generally cylindrical in shape with opposite ends 46 and 48 and may be horizontally mounted upon the first fluid reservoir 12 near the end 36 thereof in a piggy-back fashion. A valve controlled second fluid outlet 50, similar to the first fluid outlet, is disposed through the vertically lower portion of the end 46 of the primary reservoir 40. A circulation pump 52, generally mounted upon the primary reservoir 40 and connected thereto via a circulation conduit (not shown), may be provided to circulate the first quantity of the second fluid to prevent particles contained therein from settling out of solution.

The secondary second fluid reservoir 42 (sometimes referred to as the secondary reservoir 42) is generally a fluid-holding tank of any suitable shape and material such as the rectangular tank shown in FIG. 4. A fluid inlet 54 is provided through the vertically upper portion of the secondary reservoir 42, the fluid inlet 54 being controlled by the float valve 44. A third fluid outlet 56 is provided through the vertically lower portion of the secondary reservoir 42 and may include a shut-off valve mechanism if desired.

Referring particularly to FIG. 4, the float valve 44 is a conventional type utilized to control the level of a fluid within a chamber. In the present invention, the float valve 44 allows flow of the second fluid into the secondary reservoir 42 when the level of the concentrate fluid in the secondary reservoir 42 falls below a predetermined level.

Referring to FIG. 3, the nozzle assembly 16 is generally comprised of a proportioning nozzle 58, an inlet coupling 60 and a support bracket assembly 62.

Referring to FIG. 5, the proportioning nozzle 58, which is preferably constructed of a rigid, tubular material such as metal or plastic, has a flanged upper end 64, a notched lower end 66, a cylindrical bore 68 extending axially therethrough defining a mixing chamber 70 having an inlet end 72 and an outlet end 74, and a bore 76 extending radially from the bore 68 near the upper end 64. A first nozzle insert 78 is pressed into the upper portion of the bore 68 and includes an axial bore 80 defining a first fluid inlet passage 82. A second nozzle insert 84 is pressed into the bore 76 and includes an axial bore 86 defining a second inlet passage 88.

The length to diameter ratio of the mixing chamber 70 is preferably from 4:1 to 9:1. The ratio of the diameter of the first fluid inlet passage 82 to the diameter of the mixing chamber 70 is preferably from 1:1.25 to 1:3. The diameter of the second fluid inlet passage 88 may be any desired size sufficient to facilitate relatively free flow of the second fluid.

A deflector 90, formed as an integral portion of the notched lower end 66 of the nozzle 58, is axially spaced from and extends angularly away from and across at least half of the outlet end 74 of the mixing chamber 70. A baffle 92, also formed as an integral portion of the notched end 66 of the nozzle 58, extends parallel to the axis of the mixing chamber 70 and away from the outlet end 74 thereof, the baffle 92 being sized and positioned to extend across the angular projection of the deflector 92.

The inlet coupling 60 has a threaded lower end 94, a closed upper end 96, a cylindrical bore 98 therein which defines an inlet chamber 100, and a bore 102 extending radially from the bore 98 near the upper end 96. An inlet insert 104 is pressed into the bore 102 and includes an axial bore 106. The inlet coupling 60 is connected to the nozzle 58 and, more particularly, the open lower end 94 of the inlet coupling 60 is tightly seated upon the flanged upper end 64 of the nozzle 58 via a conventional coupling nut 108.

The support bracket assembly 62 is generally comprised of a conventional two-piece pipe clamp 110, which is fastened around a portion of the folding boom assembly 28, and a collar 112 having a portion bolted to the clamp 110 and another portion retained around the inlet coupling 60 via a conventional retaining nut 114.

The first fluid conduit 18 is connected between the first fluid reservoir 12 and the first fluid inlet passage 82 via the first fluid outlet of the first fluid reservoir 12 and the inlet coupling 60. The second fluid conduit 20 is connected between the second fluid reservoir 14 and the second fluid inlet passage 88 via the second fluid outlet 50 and the secondary second fluid reservoir 42. More particularly, a first portion 116 of the second fluid conduit 20 is connected between the second fluid outlet 50 and the float valve 44; and a second portion 118 thereof is connected between the third fluid outlet 56 and the second fluid inlet passage 88. The first and second fluid conduits 18 and 20, respectively, are generally comprised of rigid and/or flexible tubular portions made of any conventional tubing material.

In the preferred embodiment, a plurality of nozzle assemlies 16 are used and are connected to the first and second fluid reservoirs 12 and 14, respectively, via first and second distribution manifolds 120 and 122, respectively. The first and second manifolds 120 and 122, respectively, are each comprised of tubular portions 124 with conventional T-connectors 126 to facilitate connection of each nozzle assembly 16 to the respective manifolds 120 and 124 via coupling conduits 128 and 130, respectively.

The components of the spraying system 10 are generally positioned, with respect to one another, to effect proper flow of the carrier fluid and the concentrate fluid into the mixing chamber 70 of the nozzle 58. More particularly, the lowest level of the first fluid reservoir 12 may be positioned vertically above the level of the first fluid inlet passage 82 to facilitate gravity flow of the first fluid or a pump (not shown) may be interposed in the first fluid conduit 18 to provide a substantially constant rate of flow of the first fluid. The secondary reservoir 42 has at least a portion thereof positioned vertically below the level of the second fluid inlet passage 88 with the level of the concentrate fluid held therein being vertically maintained below the level of the second fluid inlet passage 88 via the float valve 44 to prevent gravity flow of the second fluid into the mixing chamber 70. At least a portion of the secondary reservoir 42 may be positioned vertically below the level of the concentrate fluid held in the primary reservoir 40 to facilitate gravity flow of the second fluid into the secondary reservoir 42 or flow to reservoir 42 may be provided by a pump (not shown).

OPERATION

Upon opening the second fluid outlet 50, the second fluid will flow from the primary reservoir 40 to the secondary reservoir 42 under control of the float valve 44. Upon opening the first fluid outlet (not shown), a stream of the first fluid will flow to the nozzle assembly 16 via the first fluid conduit 18 and, upon passage into the mixing chamber 70 via the first fluid inlet passage 82, will induce suction to draw a stream of the second fluid from the secondary reservoir 42 via the second fluid conduit 20 and, more particularly, via the second fluid inlet passage 88.

The fluid mixture flows turbulently through the mixing chamber 70 and is ejected at the outlet end 74 thereof. When the ejected stream of fluid contacts the deflector 90, it is directed toward the baffle 92 whereby the fluid stream is further mixed and is distributed therefrom in a fanlike spray.

Changes may be made in the construction and the arrangement of the parts or the elements of the various embodiments as described herein without departing from the spirit and scope of the invention as defined in the following claims.

What is claimed is:

1. A spraying system for distributing a first fluid having a second fluid entrained therein, the system comprising:

a first fluid reservoir for holding the first fluid;

a second fluid reservoir for holding the second fluid;

a proportioning nozzle having an upper end and a notched lower end; a bore extending axially through the nozzle forming a mixing chamber having an inlet end and an outlet end, the mixing chamber having a length to diameter ratio of from 4:1 to 9:1; a first fluid inlet passage extending axially from the inlet end of the mixing chamber through the upper end of the nozzle, the ratio of the diameter of the first fluid inlet passage to the diameter of the mixing chamber being 1:1.25 to 1:3, the first fluid inlet passage being connected to the first fluid reservoir whereby a stream of the first fluid will flow through the first fluid passage into the inlet end of the mixing chamber; a second fluid inlet passage extending radially through the nozzle from the mixing chamber near the inlet end thereof, the second fluid inlet passage being connected to the second fluid reservoir whereby a stream of the second fluid is drawn into the mixing chamber by suction induced via passage of the stream of the first fluid into the mixing chamber, a mixture of the first and second fluids flowing turbulently through the mixing chamber and being ejected at the outlet end thereof; a deflector forming a portion of the notched lower end of the proportioning nozzle and a baffle forming another portion of the notched lower end of the proportioning nozzle, the deflector being axially spaced from and extending angularly away from and across at least half of the outlet end of the mixing chamber, and the baffle extending parallel to the axis of the mixing chamber and away from the outlet end thereof, the baffle being sized and positioned to extend across the angular projection of the deflector, whereby the stream of fluid ejected from the mixing chamber contacts the deflector, is directed toward the baffle and is further mixed and distributed therefrom in a fan-like spray.

2. The spraying system of claim 1 wherein the second fluid reservoir is further defined as comprising:

a primary second fluid reservoir holding a first quantity of the second fluid;

a secondary second fluid reservoir holding a second quantity of the second fluid, the second quantity being less than the first quantity, and the secondary second fluid reservoir having at least a portion positioned vertically below the level of the second fluid inlet passage and the level of the second fluid in the primary second fluid reservoir; and a float valve connected between the primary second fluid reservoir and the secondary second fluid reservoir, the float valve maintaining the level of the second fluid in the secondary second fluid reservoir at a predetermined level vertically below the level of the second fluid inlet passage; and wherein the second fluid conduit is further characterized as being connected between the secondary second fluid reservoir and the second fluid inlet passage.

* * * * *